United States Patent Office 3,362,508
Patented Jan. 9, 1968

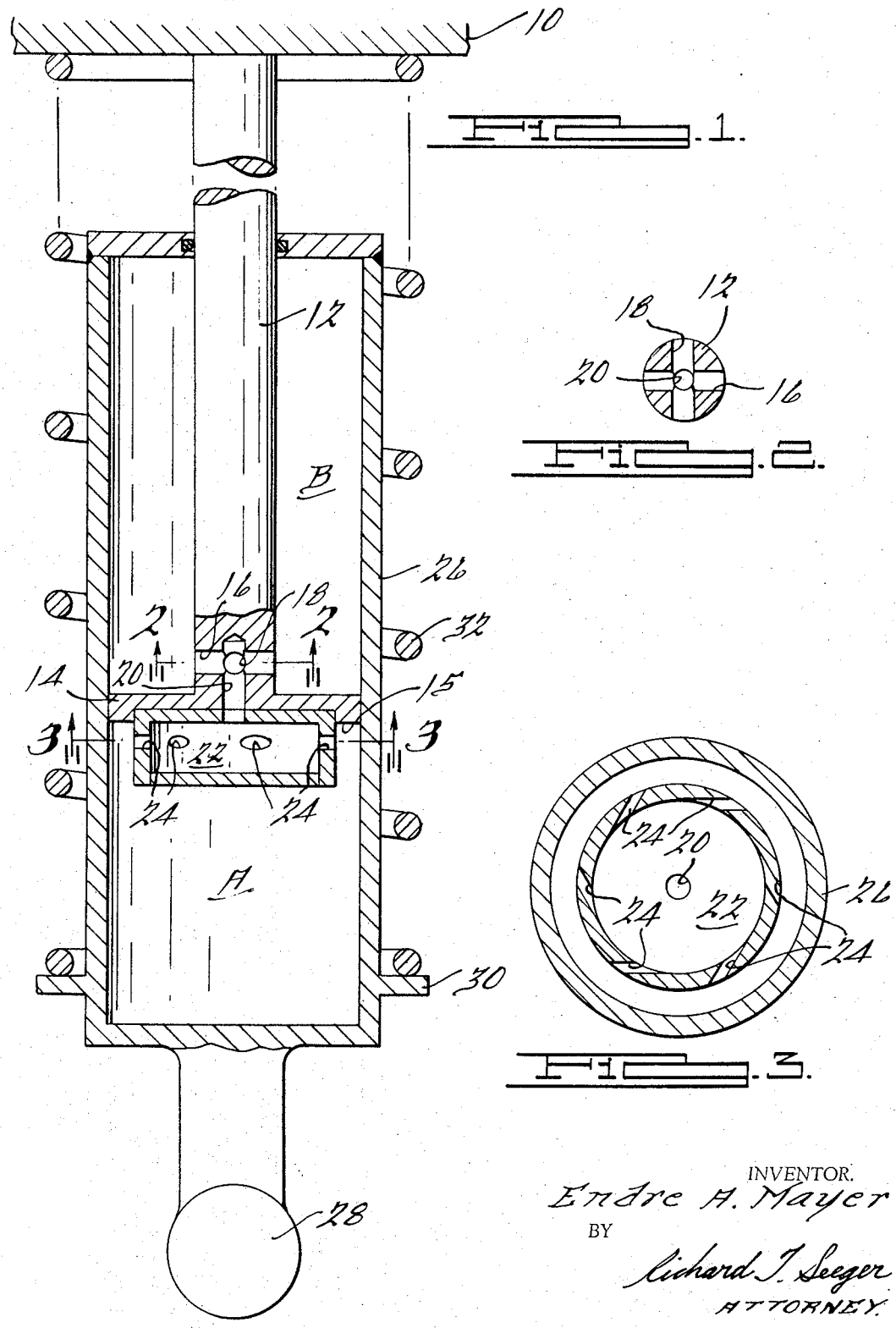

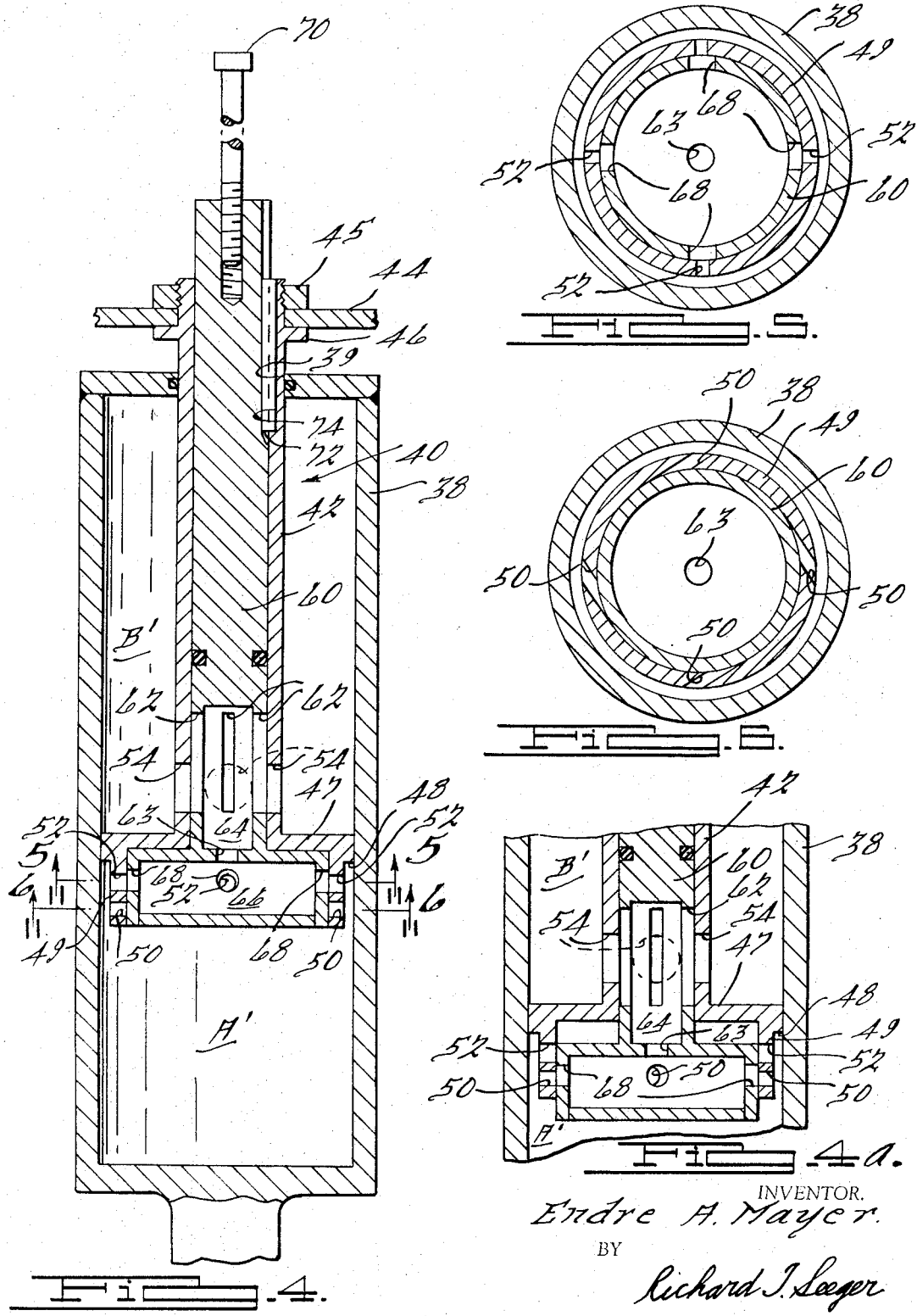

3,362,508
VARIABLE VORTEX PISTON DEVICE
Endre A. Mayer, Birmingham, Mich., assignor to The Bendix Corporation, a corporation of Delaware
Filed June 6, 1966, Ser. No. 555,364
2 Claims. (Cl. 188—88)

ABSTRACT OF THE DISCLOSURE

A variable damping device having a piston in sliding engagement with a cylinder for dividing the cylinder into a first and second chamber, a vortex housing mounted on the piston with an axial passageway for communication with the first chamber, tangential and radial passageways for communication with the second chamber, and a member with an opening which is movable with respect to the vortex housing to vary the restrictions of the radial and axial passageways.

---

This invention pertains to a variable vortex piston device and more particularly to a fluidic device that is reciprocable in a cylinder and has substantially free movement in one direction of reciprocation and is restricted in proportion to the piston speed in the opposite direction of reciprocation and therefore may be used in such devices as a vehicle shock absorber.

A vortex device causes fluid to flow in a vortex when flowing in one direction but not when flowing in the opposite direction. The use of fluid vortex devices as check valves is known to the art and is shown in U.S. Patent 1,839,616 to D. Thoma. This invention improves over the art by incorporating a fluid vortex device in the piston of a device such as a vehicle shock absorber to provide freedom of movement of the piston in a shock absorber cylinder in one direction and increase resistance to movement of the piston in the shock absorber cylinder in the opposite direction in proportion to the piston speed in the opposite direction thereby providing the basic requirements of a shock absorber. Also this invention provides a device which, with a simple adjustment, can vary the shock absorbing action of the piston movement in the shock absorber cylinder.

It is therefore an object of this invention to incorporate a fluid vortex device in a piston of a shock absorber, or like member, to provide economical, simplified mechanism with the characteristics desired in a shock absorbing type device.

It is another object of this invention to incorporate in the fluid device of the previous object means for adjusting the vorticity of the fluid device for a given piston rate movement thereby resulting in variable shock absorbing movement. When the device is used as a vehicle shock absorber, it may be adjusted to accommodate variable loads and variable operating conditions such as a change in surface conditions.

These and other objects will become more apparent when preferred embodiments of this invention are considered in connection with the drawings in which:

FIGURE 1 is a simplified schematic sectioned view of a device of this invention embodied in a vehicle shock absorber;

FIGURE 2 is a section taken at 2—2 of FIGURE 1;

FIGURE 3 is a section taken at 3—3 of FIGURE 1;

FIGURE 4 is a schematic sectioned view of a second embodiment of this invention having variable shock absorbing characteristics;

FIGURE 4a is a partial view of the device of FIGURE 4 in an alternate position;

FIGURE 5 is a section taken at 5—5 of FIGURE 4; and

FIGURE 6 is a section taken at 6—6 of FIGURE 4.

In FIGURE 1 is shown a vehicle frame 10 having attached thereto a piston rod 12 which has fixed to the end thereof piston 14. Formed in piston rod 12 are a pair of transverse passages 16, 18 which are connected to common axial passage 20 which communicates with the chamber 22 formed in piston 14. A plurality of tangential passages 24 are formed in the wall of piston 14 and form fluid communication between piston chamber 22 and the lower portion A of cylindrical chamber 26.

Shock absorber cylinder 26 is connected to wheel axle 28 and has an annular flange 30 for supporting a spring 32 which urges cylinder 26 away from the vehicle frame 10. Piston 14 has an annular rim 15 which is slidable along the inner walls of chamber 26 and forms a substantially fluid tight seal therewith.

*Operation of the embodiment of FIGURES 1–3*

When piston 14 moves in a downward direction in cylindrical chamber 26, as would be the case when wheel axle 28 was raised due to an encounter between the wheel and an obstacle in the road, fluid will be forced from the lower portion A below piston 14 of chamber 26 through tangential ports 24, which causes a vortical motion of fluid in chambers 22, and the fluid will then pass through axial passage 20 and transverse passages 16, 18 to the upper portion B, above piston 14, of cylinder 26. The vortical motion of the fluid in cylinder 22 offers a resistance to the fluid passage and therefore there will be resistance to the movement of piston 14 in cylinder 26. Also, the higher the rate of downward movement of piston 14 in cylinder 26, the higher the rate of vorticity of fluid flow in chamber 22 and hence the more resistance to the downward movement of piston 14.

When piston 14 is in return stroke and moving upwardly in cylinder 26, the fluid will pass through passages 16, 18, axial passage 20, chamber 22, and out tangential ports 24 into the lower portion A of cylinder 26. There will be relatively little resistance to this fluid flow since no vorticity is induced in the chamber 22 when the fluid passes in this direction. It can be seen therefore that a shock absorber is provided with a very simple, inexpensive, and sturdy device since there are no moving parts in the piston itself.

*Embodiment of FIGURES 4, 5 and 6*

The embodiment of FIGURES 4, 5 and 6 shows a shock absorber having the capability of varying the shock absorbing action. A cylinder 38 may be attached at its lower end to a wheel axle, as shown for cylinder 26 in FIGURE 1. A piston assembly 40 is slidably reciprocable in cylinder 38. Assembly 40 has an outer tube 42 which is fixed to vehicle frame 44 by means of nut 45 and flange 46. Tube 42 has an enlarged bottom 47 which has a rim 48 seated against the inner surface of cylinder 38 and slidably movable relative thereto. Annular wall 49 extends from rim 48.

Wall 49 has four tangential ports 50 spaced equally thereabout and four radial ports 52, each aligned in the axial direction with corresponding tangential ports 50. Formed in the tube 42 above rim 48 are a plurality of openings 54.

Located inside tube 42 and slidably engaged therewith is shaft member 60 which has near its lower end a plurality of ports 62 which register with ports 54. Ports 62 communicate with a central passage 64 which is located adjacent to and in fluid communication with a vortex chamber 66 which has formed on the outer walls thereof four passages 68 which are registrable when in an upper axial position relative tube 42 with radial passages 52, as shown in FIGURE 4, and when moved to a lower axial position relative tube 42 are registrable with tangential passages 50 as shown in FIGURE 4a. When piston 50 is in an intermediate position, it is registrable with both radial and tangential passages 52, 50 for a combined effect which will be later described. The upper end of shaft 60 is connected to a manual adjusting knob 70 which is used to move piston 60 in cylindrical member 42. In order to prevent shaft 60 from rotating in tube 42, a key 72 is formed on member 42 and rides in a keyway 74 formed in shaft 60.

*Operation of the embodiment of FIGURES 4 and 5*

The piston assembly 40 is shown to divide cylinder 38 into chamber A' which is below the chamber 66 and chamber B' which is above chamber 66. On movement of piston 40 in a downward direction in cylinder 38, fluid would be forced through ports 50 and/or 52, depending on the relative position of shaft 60 in tube 42, into the vortex chamber 66, into opening 64 and then ports 54 into chamber B'. If we assume that shaft 60 is in the uppermost position in tube 42, as shown in FIGURE 4, then the minimum vortical flow will occur in chamber 66 resulting in the minimum resistance to piston movement downward in cylinder 38. If shaft 60 is moved to the lowermost position in tube 42, as shown in FIGURE 4a, then communication between chamber A' and chamber B' will take place only through tangential ports 50, which are now registered with opening 68, through chamber 66, and then port 54 to chamber B'. This will offer a maximum resistance to fluid flow since the tangential ports 50 will induce a vortical flow in chamber 66 and hence the shock absorbing action will be at a high level. By moving manual control 70 in an intermediate position between those shown in FIGURE 4 and FIGURE 4a, a portion of the fluid flowing between chamber A' and chamber B' will enter through radial port 52 and a portion will enter in tangential ports 50 with the relative portions depending upon the position of manual control 70. The more fluid entering tangential ports 50, the larger the vortical flow in chamber 66 and hence the greater the shock absorbing action. The manual control 70 may be located in the operator's compartment and the shock absorbing action can be modified as necessary to compensate for any change in road surface or operating condition.

Although this invention has been disclosed and illustrated with reference to particular applications, the principles involved are susceptible of numerous other applications such as door closer, machine controls, and the like, which will be apparent to persons skilled in the art. The invention is, therefore, to be limited only as indicated by the scope of the appended claims.

Having thus described my invention, I claim:
1. Apparatus comprising
   cylinder means,
   piston means being reciprocal in and close fitting with said cylinder means for dividing said cylinder means into a first and second chamber,
   a vortex housing means on said piston means for containing vortical flow having an axial passageway for communication with said first chamber, a tangential passageway and a radial passageway for communication with said second chamber, and
   adjustable means for restricting said tangential and radial passageways thereby controlling the vorticity of flow in said vortex housing means for a given piston means movement within said cylinder means.
2. The apparatus of claim 1 wherein said adjustable means is a member having an opening therein which opening is alignable with said tangential and radial passageways by movement of said member relative to said vortex housing.

References Cited

UNITED STATES PATENTS

| | | | |
|---|---|---|---|
| 1,448,229 | 3/1923 | Miller et al. | 188—96 |
| 3,146,862 | 9/1964 | Van Winsen | 188—88 |
| 3,220,517 | 11/1965 | Lorenz | 188—88 |

MILTON BUCHLER, *Primary Examiner.*

G. E. A. HALVOSA, *Assistant Examiner.*